A. D. BRIXEY.
MOVING PICTURE FILM.
APPLICATION FILED SEPT. 19, 1914.
1,255,288.
Patented Feb. 5, 1918.
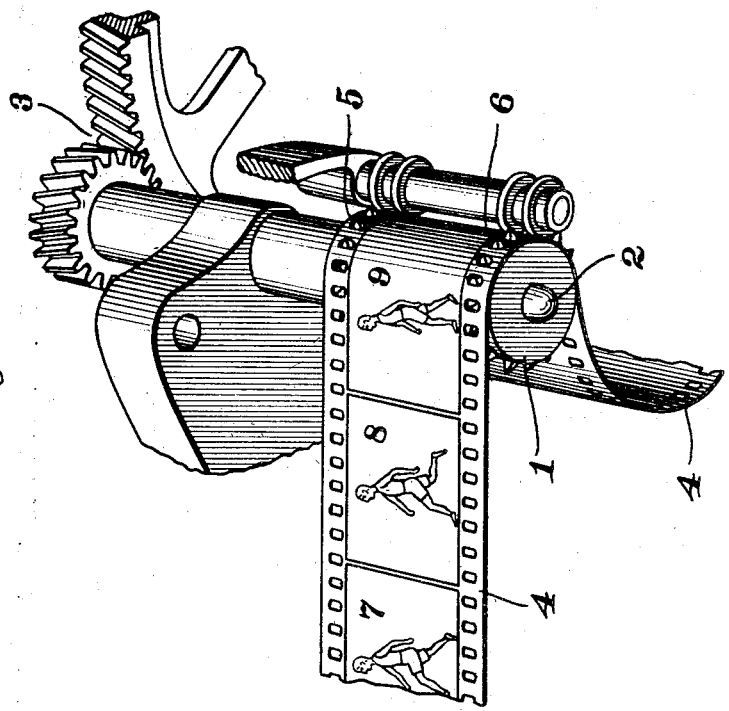
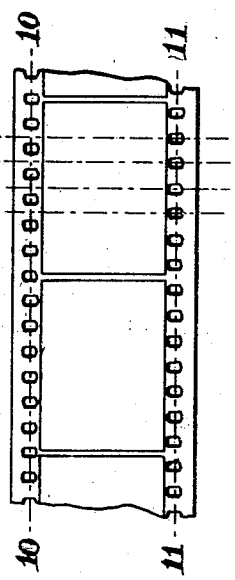
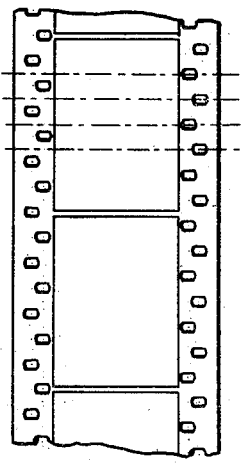
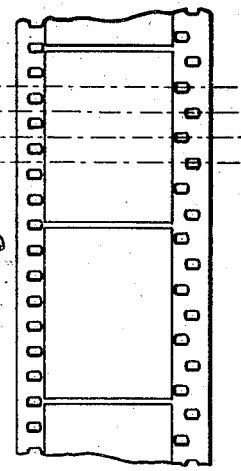
Witnesses:
E. O. Morris
M. M. Riemann
Austin D. Brixey, Inventor
His Attorney
Thomas Howe

UNITED STATES PATENT OFFICE.

AUSTIN D. BRIXEY, OF NEW YORK, N. Y.

MOVING-PICTURE FILM.

1,255,288.

Specification of Letters Patent.

Patented Feb. 5, 1918.

Application filed September 19, 1914. Serial No. 862,423.

*To all whom it may concern:*

Be it known that I, AUSTIN D. BRIXEY, a citizen of the United States, and resident of city of New York, in the county of New York and State of New York, have invented certain new and useful Improvements in Moving-Picture Films, of which the following is a specification.

This invention relates to films for moving picture machines and sprocket wheels therefor.

One object of the present invention is to provide an arrangement and construction of the film and sprocket wheels such that substitution of inflammable or otherwise inferior films is prevented.

The usual film has a single straight row of equally spaced perforations along each edge, the perforations of one row being directly opposite, in a transverse line, the perforations in the other row. It is therefore possible to effectually prevent substitution of an ordinary film by staggering the perforations and their coöperating sprocket teeth. This staggering may be brought about by unequally spacing the perforations of the film on the two sides respectively. When this is done, however, unequal pull is produced, and the film is liable to be distorted or mutilated.

According to the present invention the perforations along one side of the film are spaced the same as those along the other side and the staggering is brought about by a shifting of the perforations as a whole on one edge with relation to those on the other.

A further object of the invention is to provide an improved arrangement of the pictures on the film.

Other objects of the invention will appear hereinafter.

The invention is illustrated in the accompanying drawings of which—

Figure 1 is a perspective view of a film, its coöperating sprocket mechanism and sufficient of the driving means therefor to show how the film may be driven from any suitable source of power, as for instance the mechanism of a moving picture machine, Fig. 2 is a plan view of a flat section of the film as shown in Fig. 1, and Figs. 3 and 4 are views similar to Fig. 2 showing modified forms of film.

Referring to the drawings, the sprocket wheel 1 is secured to a rotatably mounted shaft 2 which is driven by any suitable connections, as the gearing 3, which may be driven from the motive apparatus of the moving picture machine. The film 4 has perforations along each edge adapted to register with rows 5 and 6 of teeth upon the sprocket wheel. Succeeding spaces 7, 8 and 9 upon the film, and between the rows of perforations, contain the pictures, the rapid succession of which in the machine are adapted to produce the phenomenon of moving pictures upon the screen in a manner well understood. It will be observed that the picture spaces are arranged with their greatest lengths longitudinally of the film and the pictures have their vertical axis transverse of the film. This enables a narrower film to be used and permits the machine to be turned through an angle from the position it usually occupies with relation to the longitudinal axis of the film. This is important as permitting necessary adjustment of the film and machine in certain locations.

Referring more particularly to the film of Fig. 1 and in connection with Fig. 2 wherein the film is shown in flat plan so that the relations of the parts may be more accurately observed, it will be seen that the row of perforations 10—10 along one side of the film and the row 11—11 along the other side of the film have the same spacing, but one row has been shifted longitudinally with relation to the other so that the perforations of one row are staggered with relation to the perforations in the other row, that is to say, the perforations of one row are not directly opposite the perforations in the other row in a transverse line, but a perforation of one row is opposite a space between perforations in the other row.

To accommodate this film the sprocket teeth for the two rows of perforations are arranged to register therewith, the position of the sprocket teeth bearing the same relation to each other that the perforations in the film bear to each other.

Referring now particularly to Fig. 3 there is therein shown a film which has a plurality of rows of perforations along each edge, the perforations of one row being staggered with relation to those of the other. There is a similar arrangement of the perforations at the other edge of the film but the perforations along one edge have been shifted with relation to the perforations along the other edge so that the perforations along one edge are not directly opposite to those along the other edge but are staggered with relation thereto, a perforation at one edge being opposite a space between perforations on the other edge.

In Fig. 4 is shown a modification of the invention wherein there is a single row of perforations along one edge of the film and a plurality of rows of perforations along the other edge of the film, the perforations of one of the plurality of rows along one edge being staggered in relation to the other as are those along one edge in the film of Fig. 3. It will be observed that the spacing of the perforations along the film is the same on both edges but the perforations along one edge have been been shifted longitudinally with relation to the perforations along the other edge so that the perforations along the two edges respectively are staggered with relation to each other.

In each instance the sprocket teeth are arranged with relation to each other, so that they register with the perforations of their respective films. An attempt to use the ordinary or any other film on the sprocket would be ineffectual as the perforations and teeth would not register, the film would not operate satisfactorily and would be distorted or mutilated.

While the invention has been illustrated in what are considered its best applications it may be embodied in other structures without departing from its spirit. It is not therefore limited to structures shown in the drawings.

I claim and desire to obtain by Letters Patent the following:

1. A film for moving picture machines having perforations extending along each edge, the perforations along one edge being spaced the same distance as those along the other edge and staggered with relation thereto.

2. A film for moving picture machines having respectively equidistant perforations extending along each edge, the perforations along one edge being spaced the same distance as those along the other edge and staggered with relation thereto.

3. A film for moving picture machines having perforations staggered with relation to each other extending along one edge, and perforations extending along the other edge, the perforations along one edge being spaced the same distance as those along the other edge and staggered with relation thereto.

4. A film for moving picture machines having perforations staggered with relation to each other extending along one edge, and perforations arranged in a straight line along the other edge, the perforations along one edge being spaced the same distance as those along the other edge and staggered with relation thereto.

Signed at borough of Manhattan, in the county of New York and State of New York this 12th day of September A. D. 1914.

AUSTIN D. BRIXEY.

Witnesses:
K. G. LEARD,
M. M. RILLNAW.